United States Patent
Winton

(10) Patent No.: US 9,374,856 B2
(45) Date of Patent: Jun. 21, 2016

(54) ENERGY SAVING UNDERCABINET LIGHTING SYSTEM USING LIGHT EMITTING DIODES

(76) Inventor: Jeffrey Winton, Highland Park, IL (US)

( * ) Notice: Subject to any disclaimer, the term of this patent is extended or adjusted under 35 U.S.C. 154(b) by 533 days.

(21) Appl. No.: 12/284,559

(22) Filed: Sep. 23, 2008

(65) Prior Publication Data

US 2012/0218746 A1    Aug. 30, 2012

(51) Int. Cl.

| | |
|---|---|
| H05B 37/02 | (2006.01) |
| H05B 33/08 | (2006.01) |
| F21V 23/04 | (2006.01) |
| H02H 9/04 | (2006.01) |
| F21V 23/06 | (2006.01) |
| F21Y 101/02 | (2006.01) |
| F21V 29/507 | (2015.01) |

(52) U.S. Cl.
CPC ............... *H05B 33/0806* (2013.01); *F21S 4/28* (2016.01); *F21V 23/04* (2013.01); *H02H 9/041* (2013.01); *F21V 23/06* (2013.01); *F21V 29/507* (2015.01); *F21Y 2101/02* (2013.01)

(58) Field of Classification Search
CPC .................... F21Y 2103/003; F21Y 2113/005; H05B 37/02; H05B 33/0824; H05B 33/0809; H05B 33/086
USPC ................................ 315/291, 185 R, 224, 307
See application file for complete search history.

(56) References Cited

U.S. PATENT DOCUMENTS

| | | | |
|---|---|---|---|
| 6,088,211 A * | 7/2000 | Pitel | 361/212 |
| 6,283,612 B1 | 9/2001 | Hunter | |
| 7,296,912 B2 | 11/2007 | Beauchamp | |
| 2006/0022214 A1* | 2/2006 | Morgan et al. | 257/99 |
| 2007/0052376 A1* | 3/2007 | Lee | 315/312 |
| 2007/0228999 A1* | 10/2007 | Kit | 315/291 |
| 2007/0242441 A1 | 10/2007 | Aldrich et al. | |
| 2007/0247851 A1 | 10/2007 | Villard et al. | |
| 2007/0290621 A1 | 12/2007 | Clark et al. | |
| 2008/0055900 A1 | 3/2008 | Budike et al. | |
| 2008/0062689 A1 | 3/2008 | Villard | |
| 2008/0062691 A1 | 3/2008 | Villard et al. | |
| 2008/0080190 A1 | 4/2008 | Walczak et al. | |
| 2008/0089069 A1 | 4/2008 | Medendorp | |

* cited by examiner

*Primary Examiner* — Tuyet Vo
*Assistant Examiner* — Amy Yang
(74) *Attorney, Agent, or Firm* — Clifford H. Kraft

(57) ABSTRACT

The present invention relates to an energy efficient undercabinet lighting system with a low profile switch mode power supply complying with Class 2 requirements of Underwriters Lab. Northbrook, Ill. This power source is enclosed in a suitable electrical container to provide constant current to the Light Emitting Diodes (LED's) with long life. The system is specially designed to reduce the power consumption as compared to Halogen lamps or Fluorescent lamps without compromising light output. The height of this lighting system is 0.8 inch. A specifically formed transparent diffuser is positioned over the Light Emitting Diodes for uniform illumination over a desired area. These luminaries provide focused light in a desired area and can be coupled or linked by an external interconnect cord. The luminarie provides manual dimming capability.

9 Claims, 7 Drawing Sheets

ENERGY SAVING UNDERCABINET LIGHTING SYSTEM USING LIGHT EMITTING DIODES

BACKGROUND OF INVENTION

The invention is directed to an energy savings under-cabinet Lighting System using Light Emitting Diodes (LED's). There is a need for saving more energy in these under-cabinet luminaries using specifically designed integral power supply with low power consumption to provide power to the Energy Saving LED's. This invention is an energy saving under-cabinet lighting system.

A light emitting diode (LED) is a semiconductor device that creates light using solid-state electronics. A diode is composed of a layer of electron rich material separated by a layer of electron deficient material which forms a junction. Power applied to this junction excites the electrons in the electron rich material leading to photon emission and the creation of light. Depending on the chemical composition of the semiconductor layers, the color of light emission will vary within the visible range of electromagnetic spectrum.

Generally there are 2 types of power supplies, magnetic and electronic switch mode. In this lighting system, the switch mode electronic power supply is used for energy efficiency, low profile, and light weight, to provide power to LED's.

LED's are much more energy efficient than their incandescent and fluorescent lamps. LED's are very energy efficient producing up to 90 percent light output with very little heat dissipation. Also, LED lighting technology includes features such as less energy consumption, long service life, high quality light, and suitability for cold temperature operation. In addition, LED's do not contain mercury and are environment friendly.

The simplicity of the power supply using very few components greatly improves the reliability of this lighting system.

In addition, a specially angled diffuser to converge the light output from the lighting system of the working area of the undercabinet is marked as 7 in FIG. 1 and FIG. 2

Also, in addition, the lenses of the LEDs are so chosen that the inner array near the wall has 30 degrees spread, and the outer array away from the wall has 60 degree spread to achieve more light in the working area of the undercabinet.

Finally, in a preferred embodiment, the power supply is isolated and coupled to the LEDs so that it has a power factor of at least 90%.

While a preferred embodiment has been shown, modifications and changes may become apparent to those skilled in the art which shall fall within the spirit and scope of the invention. It is intended that such modifications and changes be covered by the attached claims.

TECHNICAL FIELD

The subject lighting system herein pertains to lighting systems using LED's and optimization techniques to reduce energy consumption for lighting systems.

More specifically, the subject matter disclosed herein relates to increasing efficiency of under cabinet lighting.

US patent class: 362/800, 257/88 and 438/22

SUMMARY OF INVENTION

The present invention relates to an energy saving under-cabinet luminaries using an energy efficient switch mode power supply optimized to provide maximum power to the LEDs while remaining within UL class 2 requirements of the Power Supply.

In an embodiment the invention provides an energy saving under-cabinet Luminaire consisting of an enclosure, Class 2 integral power supply to provide power LEDs arranged in a special pattern to effectively replace 8 W, 13 W and 15 W fluorescent lamps or equivalent halogen lamps resulting in 50% of energy savings. Every component is individually optimized to save energy.

These and other features of the invention will become clearer in the following detailed description of the presently preferred embodiments with reference to the accompanying drawings.

DETAILS OF THE DRAWINGS

DETAILED DESCRIPTION OF PREFERRED EMBODIMENT

The features of the invention will become clearer in the following detailed description of the presently preferred embodiments with reference to the accompanying drawings.

Figure 1:
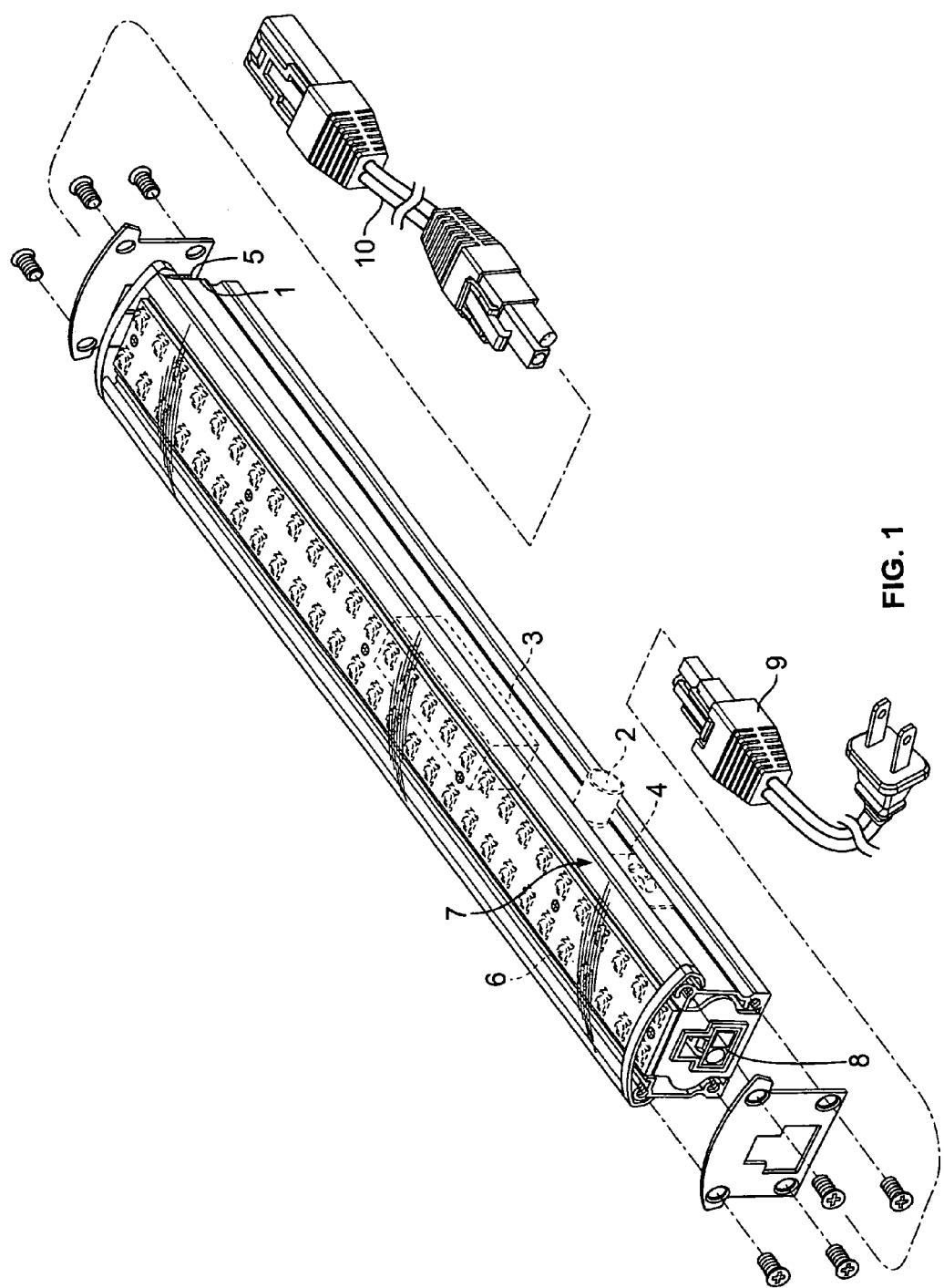
FIG. 1 shows the full exploded view of the entire LED under-cabinet unit lamp unit with all components marked.
Figure 2A:
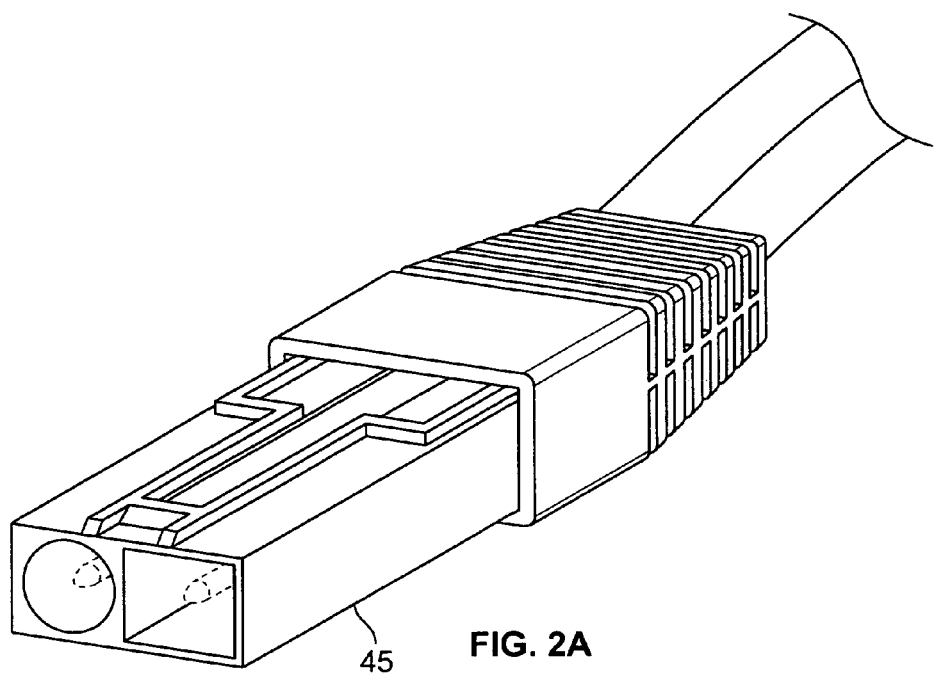
FIG. 2A shows the front view of a quick input connector for easy electrical connections.
Figure 2B:
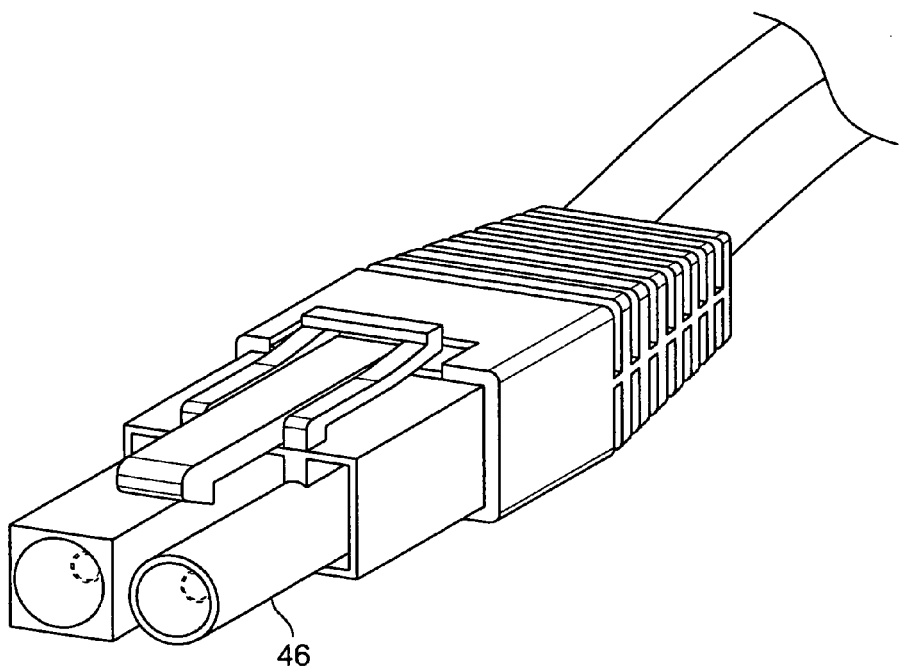
FIG. 2B shows the front view of a quick output connector for easy electrical connections.

In the preferred embodiment, as illustrated in FIG. 1, the main components are the input power connector 8, coupled to an external power cord 9, an enclosed SMPS power supply 3, providing the necessary voltage and content current to the LED's 6, a simple resistive dimmer potentiometer switch 2, to reduce the current to the LED's to create dimming effect, a main on/off switch 4, and an output connector 5 to link the unit with an external interconnect cord 10 to another unit.

In the preferred embodiment, two configurations are described, one with 56 LED's and another with 80 LED's.

Figure 3A:
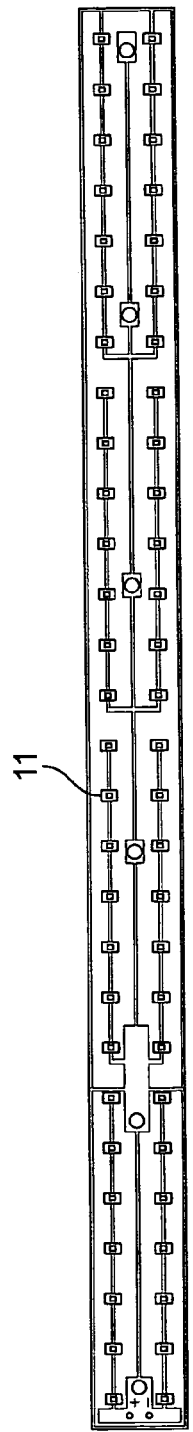
FIG. 3A shows the front view array of layout of the LED's on a printed wiring board for 56 LED boards.

The 56 LED's put out enough light output to replace and undercabinet light fixture using one F8T5 (8 W) fluorescent lamp or equivalent lamp. This is shown in FIG. 3A.

Figure 3B:
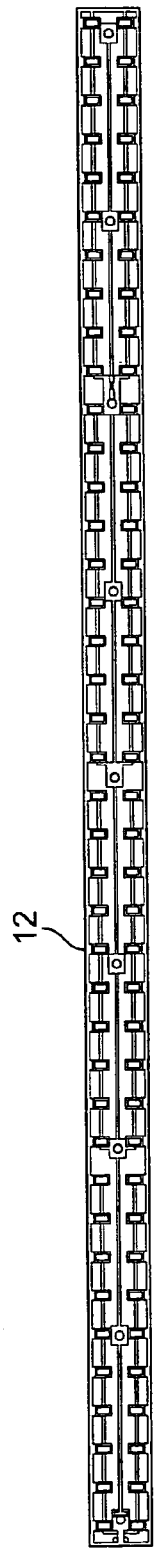
FIG. 3B shows the front view array of layout of the LED's on a printed wiring board for 80 LED boards.

The 80 LED's put out enough light output to replace and undercabinet fixture using one F15T8 (15 W) or F13T5 (13 W) fluorescent lamp as shown in FIG. 3B.

The numbers 56 and 80 are arbitrary and so chosen to be cost effective. These numbers could change depending on growth of LED technology resulting in cost reduction by using fewer LED's with higher lumens per watt.

Figure 6:
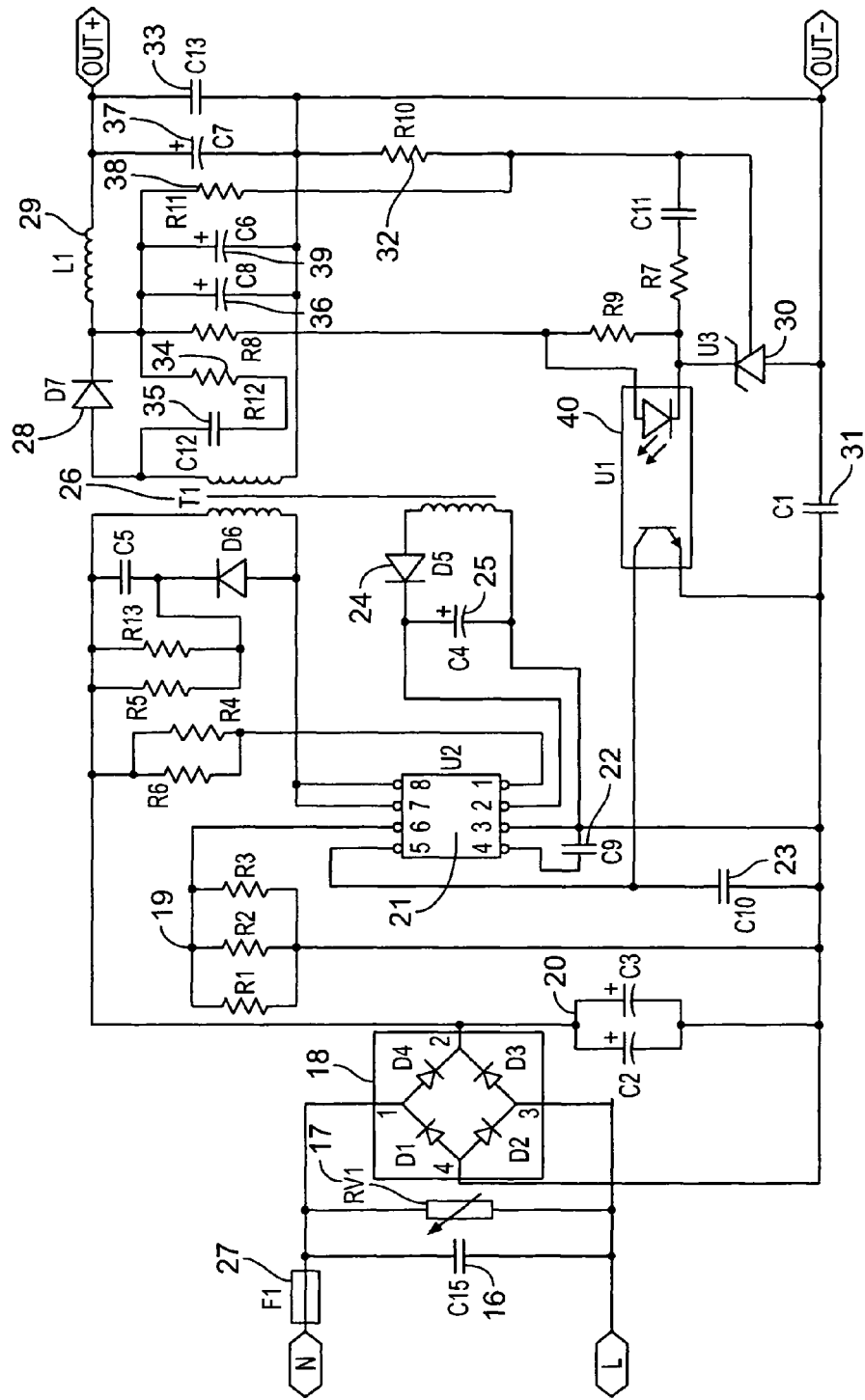
FIG. 6 shows the schematic diagram of the circuit of the LED Power Supply with components marked.

The design of the power supply 3 is so chosen to put out 30 Vdc maximum and still come under Class 2 requirements of Underwriters Lab standards (UL Inc.) Standard 1310 by limiting the voltage and current for safety considerations without compromising the optimum performance The class 2 Power Supply schematic is illustrated in FIG. 6.

The first stage of power supply has an input stage filter network consisting of a metal oxide varistor, 17, rated 150V for surge suppression, a safety current limiting fuse, 27 rated ½ A 250 Vac, and an across the line capacitor 16, rated 22 Pico Farad (P Fd). 250V to absorb the transients.

The second stage is a full wave bridge rectifier consisting of a bridge rectifier 18, with 4 diodes, rated 1 Amp. 400V with a filter capacitor combination 20, rated 4.7 Micro Farad (M. Fd), 400V.

The third stage is a is a feeder network coupling the rectified AC voltage to an integrated control chip 21, which determines the pulse width after converting the rectified voltage to high frequency chopped voltage.

The processed signal is coupled to the transformer 26 with ferrite core and comprises of: a primary Winding consists of 135 turns of 0.15 mm enameled copper wire. a secondary consists of 32 turns of 0.2 mm enameled copper wire. This winding provides necessary output to energize the LED's.

The processed signal is fed to the transformer T1 made out of ferrite core with the following construction.

Primary Windings:
Wind 18T on the magnet core EFD15 FROM Pin 1 to Pin 3 by 0.15 enamel.

Secondary Windings:
Wind 135T on the megnet core EFD15 FROM Pin 2 to Pin 4 by 0.2 mm enamel.
Wind 32T on the magnet core EFD15 FROM Pin 8 to Pin 5 by 0.2 mm×3 enamel.

An auxiliary secondary has 7 turns of 0.15 mm enameled copper wire. This winding is also used in the feed back circuit to regulate the output voltage and current.

In essence, transformer 26 steps down the input high voltage pulses to low voltage pulses. The diode 28, rated 1 Amp. 400V, is a rectifier which is coupled to resistor 32, rated 5.1 ohms through inductor 29.

An output filter network consists of a resistor 34, rated 10 Ohms coupled to a capacitor 35, rated 680 Pico Farad (P Fd). 150V in series coupled to parallel capacitors 36 and 39, rated 220M Fd. 50V to smooth out the ripple in the output wave form. Output filter choke 29 is coupled between capacitor 37 and diode 28. This choke stores magnetic energy to provide a constant output current and voltage to LED's.

Resistor 38 rated 44 K ohms, ½ w, is connected to choke 29. Choke 29 and a parallel capacitor 33 rated 470M. Fd. 30V form the output filter network.

An adjustable reference zener diode 30 is provided to regulate output voltage and current. This zener is coupled to the power supply through resistors 32 and 38, rated 5.1K Ohms and 44 K ohms respectively.

The turn on reference voltage is determined by resistors 32 and 38.

When the output exceeds the set voltage, the zener diode 30 provides a turn on signal to Opto-Isolator 40, model PC817 which is coupled to capacitor 23, rated 22 P Fd, 50V which is further coupled to pin 5 of 21 to regulate the output.

Capacitor 22, rated 68 P. Fd. 50V provides the timing frequency for oscillations.

Diode 24 rated, 1 Amp. 700V is coupled with transformer auxiliary winding of transformer 26 and capacitor 25 rated 47 M. Fd. 16V. This network provides start up current for the transformer oscillations.

Capacitor 37 rated 100 M Fd, 50 V provides necessary filtering of the output voltage by reducing the output ripple.

The LED's are laid out in a Flame retardant Printed Wiring Board (PWB) as shown in FIGS. 3A and 3B and convert the electric power input into visible white light to illuminate the under-cabinet area.

The output coupling connector 10, shown in FIG. 1 may be used to couple another unit as needed.

Figure 4:
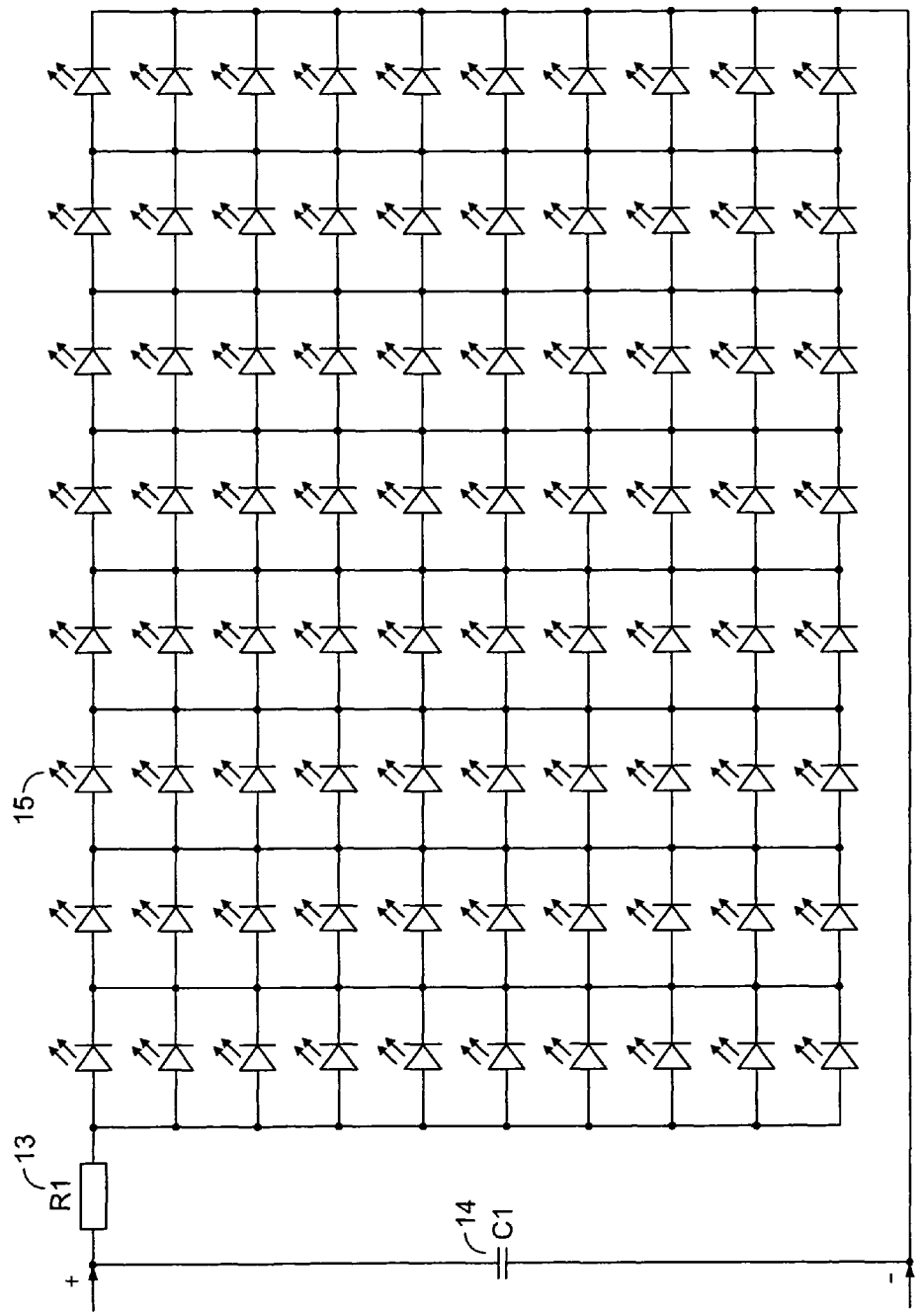
FIG. 4 shows the wiring of 80 LED's in series parallel circuit.
Figure 5:
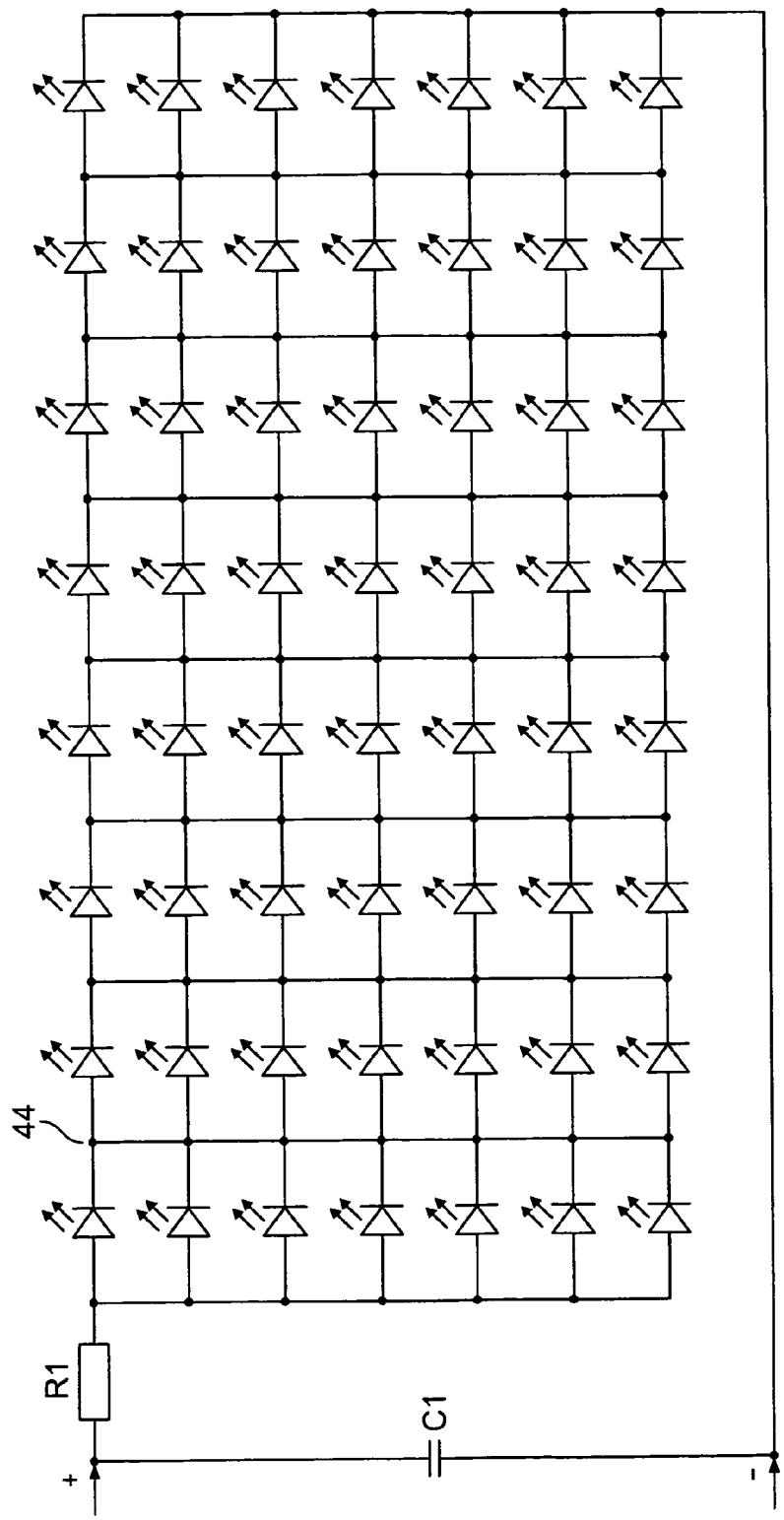
FIG. 5 shows the wiring of 56 LED's in series parallel circuit.

The regulated D C output is coupled to the LED's connected in series parallel arrays as shown FIGS. 4 and 5 for 56 LED's and 80 LED's respectively.

Figure 7:
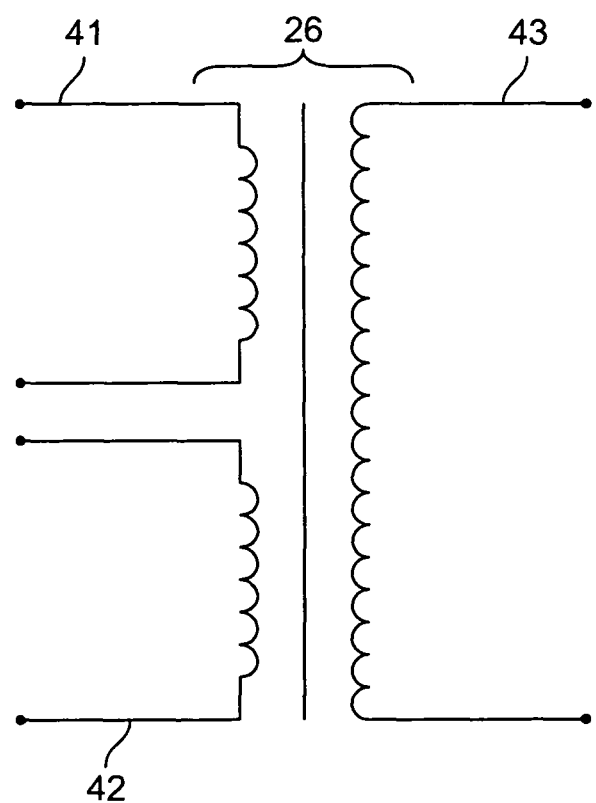
FIG. 7 shows the construction details of the output transformer of the LED Power Supply.

FIG. 7 is an illustration of output transformer segments, primary 41, auxiliary winding 42 and secondary 43.

What is claimed is:

1. An under-cabinet luminaire adapted to be mounted near a wall comprising:
    a housing adapted to fit under a cabinet with a power connector mounted on said housing;
    said housing containing a printed wiring board holding an array of LEDs and a switch-mode power supply having a power factor of greater than 90% configured to supply DC power to said printed wiring board and said array of LEDs;
    said printed wiring board containing a power control circuit with a dimmer circuit for controlling said array of LEDs, said power control circuit configured to supply a predetermined constant current to said array of LEDs as controlled by said dimmer circuit;
    a translucent light diffuser mounted on said housing adapted to provide focused light from said array of LEDs over a working area under a cabinet;
    wherein said array of LED's contains at least 56 LEDs arranged into 7 electrically parallel rows, each row having 8 LEDs in series to replace a F13T5 fluorescent tube;
    wherein lenses of LEDs in said array of LEDs are configured so that an inner row of said array near the wall has a 30 degree light spread and an outer row of said array away from the wall has a 60 degree light spread;
    a ferrite transformer in said switch mode power supply having the following windings:
    a first winding of 18 turns being on an EFD15 magnet core of 0.15 mm enamel coated wire;
    a second winding of 135 turns being on said magnet core of 0.2 mm enamel coated wire;
    a third winding of 32 turns being on said magnet core of three 0.2 mm enamel coated wires.

2. The under-cabinet luminaire of claim 1 further comprising an input filter stage including a metal oxide varistor rated to 150 volts, a safety fuse rated at ½ Ampere, and an across-line 22 pico-farad capacitor.

3. The under-cabinet luminaire of claim 1 wherein the power connector is a female power fitting.

4. The under-cabinet luminaire of claim 3 further comprising a removable power cord having a male power fitting adapted to mate with said power connector.

5. The under-cabinet luminaire of claim 1 further comprising an on-off switch mounted on said housing adapted to turn said luminaire on and off.

6. The under-cabinet luminaire of claim 1 wherein said switch mode power supply limits current to a maximum of 8 Amperes with a maximum output voltage of 30 volts DC.

7. An under-cabinet luminaire comprising:
    a housing adapted to fit under a cabinet near a wall with a power connector mounted on said housing;
    said housing containing a printed wiring board holding an array of LEDs and a switch-mode power supply configured to supply DC power to said printed wiring board and said array of LEDs, said switch-mode power supply having a power factor of greater than 90%;

said printed wiring board containing a power control circuit with a dimmer circuit for controlling said array of LEDs, said power control circuit configured to supply a predetermined constant current to said array of LEDs as controlled by said dimmer circuit;
a translucent light diffuser mounted on said housing adapted to provide focused light from said array of LEDs over a working area under a cabinet:
wherein lenses of LEDs in said array of LEDs are configured so that an inner part of said array near the wall has a 30 degree light spread and an outer part of said array away from the wall has a 60 degree light spread;
a ferrite transformer in said switch mode power supply having the following windings:
a first winding of 18 turns being on an EFD15 magnet core of 0.15 mm enamel coated wire;
a second winding of 135 turns being on said magnet core of 0.2 mm enamel coated wire;
a third winding of 32 turns being on said magnet core of three 0.2 mm enamel coated wires.

8. The under-cabinet luminaire of claim 7 wherein said array of LED's contains 56 LEDs, arranged in two rows, configured to replace a F13T5 fluorescent tube.

9. The under-cabinet luminaire of claim 7 wherein said array of LEDs contains 80 LEDs, arranged in two rows, configured to replace a F15T8 fluorescent tube.

* * * * *